Jan. 20, 1959 F. O. DE MILLAR 2,869,682
MOTOR STARTING APPARATUS
Filed April 12, 1957 3 Sheets-Sheet 1

INVENTOR.
Floyd O. De Millar
BY
ATTORNEY

INVENTOR.
Floyd O. DeMillar
BY
ATTORNEY

Jan. 20, 1959   F. O. DE MILLAR   2,869,682
MOTOR STARTING APPARATUS
Filed April 12, 1957   3 Sheets-Sheet 3
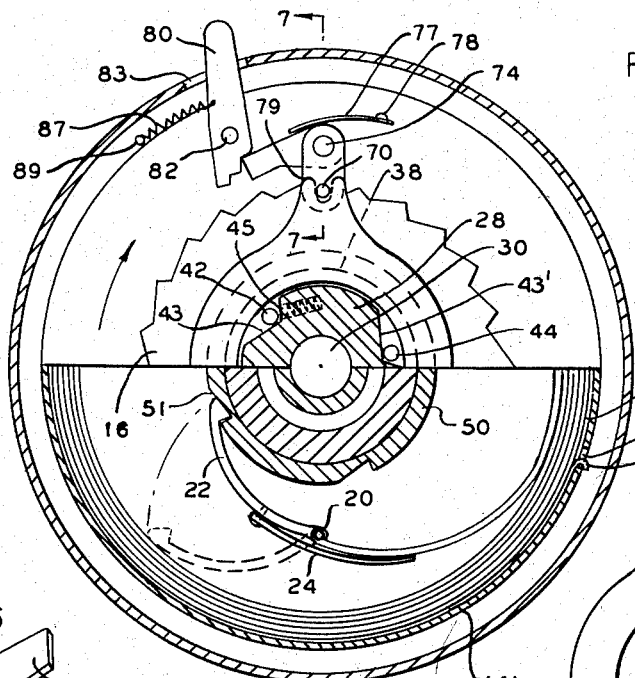
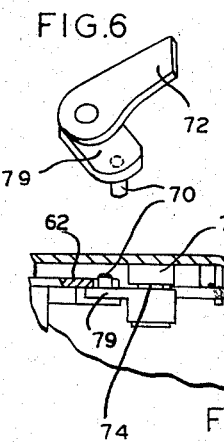
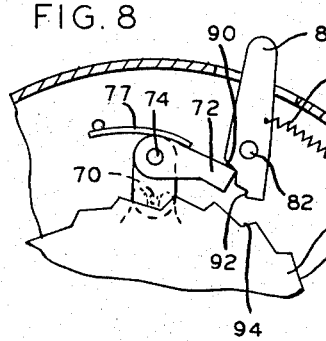
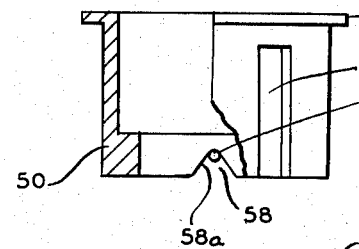
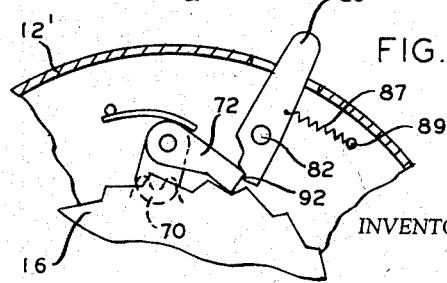
INVENTOR.
Floyd O. DeMillar
BY
ATTORNEY United States Patent Office 2,869,682
Patented Jan. 20, 1959

2,869,682

MOTOR STARTING APPARATUS

Floyd O. De Millar, Framingham, Mass., assignor to The Radian Corporation, Boston, Mass., a corporation of Massachusetts Application April 12, 1957, Serial No. 652,491

12 Claims. (Cl. 185—41)

This invention relates to a turning device for imparting rapidly accelerating rotative movement to a shaft or other rotatable body and, in particular, the invention is concerned with a starting mechanism for an internal combustion motor of the type having a rotatable shaft and flywheel wherein the starting mechanism operates to spin the motor and start it in operation.

In my co-pending application, Serial No. 523,209 filed July 20, 1955, now Patent No. 2,804,173, I have disclosed and claimed an earlier form of spring winding starting device which has been designed to obviate certain difficulties inherent in starting outboard motors, lawn mower motors, chain saw motors and the like, as well as to accomplish certain other objectives. This earlier form of starter includes a spring rotor unit mounted on a motor shaft and flywheel assembly.

The present invention has, for its general objective, these same desirable ends and is of the type also having a spring mounted on the rotor unit. Specifically, the invention seeks to provide a practical, efficient and safe apparatus by means of which a spring winding mechanism may be brought to a fully wound state and then held to be released when desired. In this way, release of this spring energy does not take place necessarily at the completion of the spring winding operation but may be desirably controlled.

A further specific object of the invention is to devise a spring actuated starting mechanism of the general class indicated wherein rotative movement of the spring winding mechanism is limited to travel in one direction only so that any possible accidental rotation of a winding handle in a reverse direction is prevented.

Still a further object of the invention is to devise a starting mechanism in which there is incorporated a manually operated trip lever which will automatically reset itself in a holding position at any time the spring winding mechanism is turned to start a winding operation.

As one means of accomplishing these objectives, I have found that I may employ a combination of a spring rotor unit and spring winding mechanism arranged in special interlocking relationship. This combination operates in a manner such that at the end of a winding operation, the spring assembly components are locked in a holding position from which they may be disengaged by a manually operated release lever. I have further devised with this interlocking arrangement, a pivoting reset device which ensures that the manual release lever will always be in a correct position for interlocking to take place when a subsequent spring winding operation starts.

These and other objects and novel features will be more apparent from an inspection of the following preferred embodiments of the invention selected for purposes of illustration and shown in the accompanying drawings in which:

Fig. 4 is a plan view of the starting device with the outer casing removed and showing half sections taken along two different cross-sectional lines;

Fig. 5 is a detail elevational view of a pawl activating ring;

Fig. 6 is a detail perspective view of a reset pawl element;

Fig. 7 is a detail view of an underside of the casing showing a special boss construction for mounting pawl interlocking components;

Fig. 8 is a detail view on one position of the reset mechanism;

Fig. 9 is a detail view of another position of the reset; and

Fig. 10 is a detail view of an oscillating drum.

Figure 1:
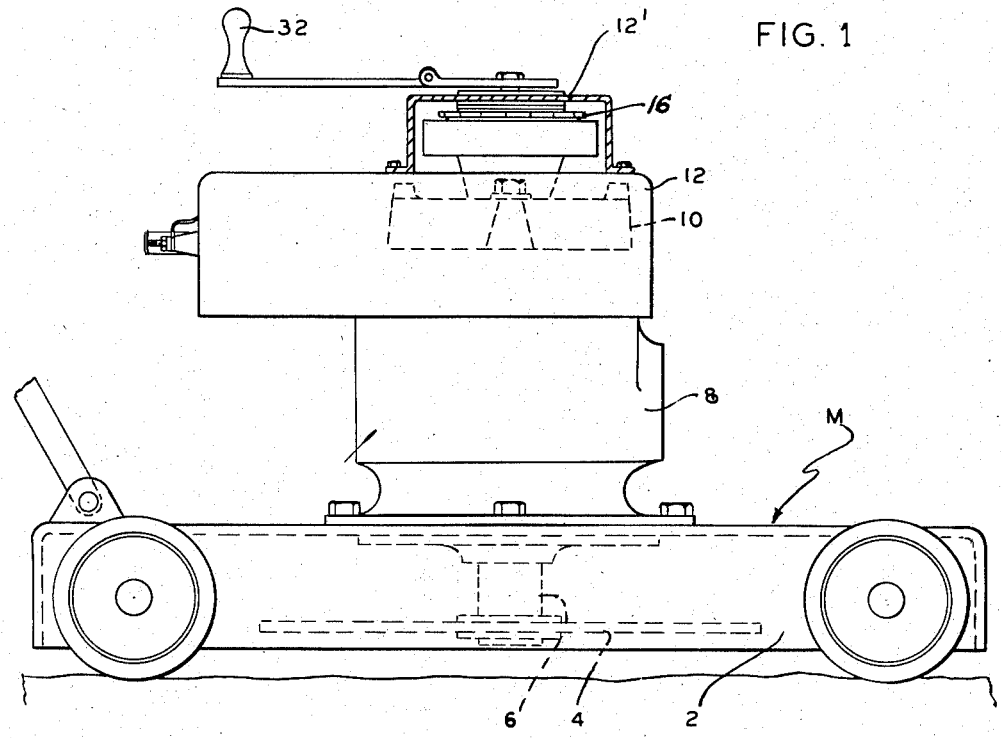
Fig. 1 is a side elevational view of a rotary type lawn mower on which is mounted the motor starting device of the invention shown with the operating handle in an open position for a winding operation.

Referring more in detail to the structure shown in these figures, arrow M indicates generally a lawn mower of the rotary type having a housing 2 in which is mounted for rotation a blade 4 on a shaft 6. A motor 8 drives the shaft and at its upper side has attached thereto a rotatable body consisting of a flywheel 10 on a shaft 11 which is enclosed by a detachable top cover 12. All of the parts noted are of well known construction and form no part of the present invention but are intended to be representative of various classes of motors with which the starting mechanism of the invention may be combined. It should be understood that the invention, although described with reference to a rotary type lawn mower is not limited to this particular type of engine and may be utilized with other rotatable bodies including shafts of various classes, centrifugals and the like.

In the preferred embodiment shown in the drawings, the starting apparatus of the invention is attached at the upper side of the lawn mower and includes as principal parts thereof a spring rotor unit which is adapted to be secured to the rotatable body 10 and a spring winding mechanism which is secured in a stationary position on the top cover 12.

Figure 3:
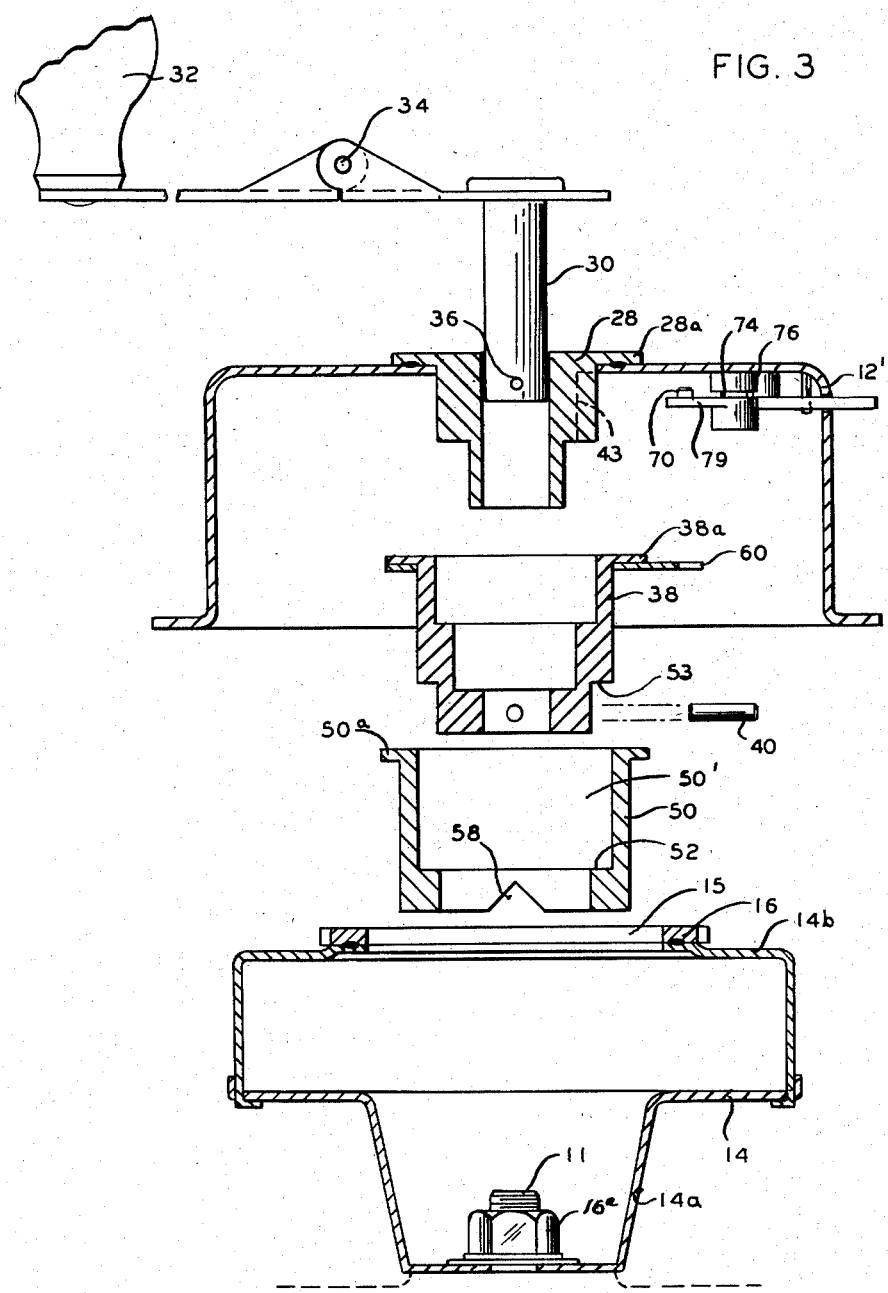
Fig. 3 is an exploded view showing in cross-section parts of the spring winding mechanism removed from one another.

Considering first the spring rotor unit, numeral 14 indicates a spring rotor casing of annular shape having a lower tubular extremity 14a through which is received a shaft 11. A nut 16a solidly secures the shaft 11 and casing 14 so that they rotate as in one unit. The casing 14 also includes a detachable upper section 14b which, as is best shown in Fig. 3, is formed with a central opening 15. Secured around the opening 15 at the top of the member 14 is an engaging member 16 which may, for example, consist of a ratchet wheel.

Figure 2:
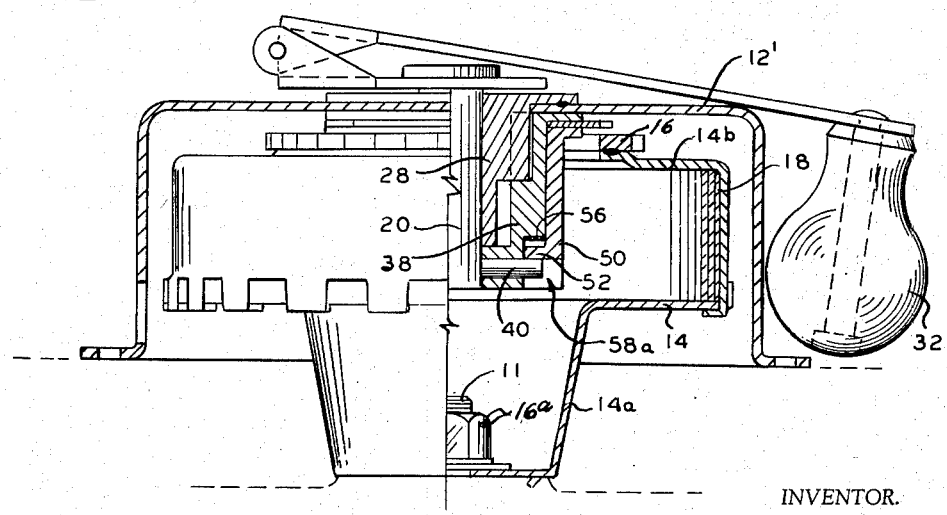
Fig. 2 is another side elevational view partly in cross-section showing parts of the starting device in greater detail.

Coiled around the inner periphery of the casing part 14b, as shown in Figs. 2 and 4, is a flat spring member 18, the outer extremity of which is formed in the shape of a hook 18a, as indicated in Fig. 4. This hooked end is adapted to engage through a slot 19 formed through the side wall of the spring casing 14b at one point therealong.

The opposite end of the spring 18 has secured thereto a pivot element 20 on which is pivotally hinged an engaging member 22. A small flat spring 24 normally seeks to hold the pivoted engaging member 22 in a radially inwardly directed position, as shown in Fig. 4, but the resistance of this spring is chosen such that it may yield in response to centrifugal forces to allow the hook to swing out into the dotted line position shown in Fig. 4.

It will be seen that all of the parts now described in reference to the spring casing constitute a spring rotor unit wihch is an integral part of the shaft 11 and, therefore, rotate with the member when the engine is moving.

Considering next the spring-winding mechanism, numeral 28 denotes a bearing member which is received through an opening on the upper side of the stationary top cover 12'. The bearing 28 is formed with a flange 28a which may be solidly secured to the top cover by screws, welding or other desired means. Rotatably supported in the bearing 28 is a winding shaft 30 at the upper extremity of which is a collapsible handle 32 pivoted at 34. This winding shaft is formed at its inner extremity with a transverse locking pin aperture 36.

When the winding shaft 30 is in a fully seated position in the bearing 28, it will be observed that its inner end projects through a reduced end of bearing 28, as shown in Fig. 2. On this inner end of the shaft is solidly secured an outer clutch sleeve 38 which is formed with locking pin apertures adapted to register with the locking pin apertures of the winding shaft to receive therethrough a locking pin 40.

The outer clutch sleeve 38 comprises one component of an overriding clutch assembly and cooperates with a second component comprised by peripheral surfaces of the bearing 28 and roller bearings to prevent rotative movement of the handle 32 in one direction. This is accomplished by arranging the roller bearings as 42, 44, etc., so that they are loosely contained in a vertically disposed position against recessed surfaces as 43, 43', best shown in the upper half section of Fig. 4. Each of these roller bearings is resiliently contained by a respective spring such as the spring 45 shown in Fig. 4. By means of this arrangement, rotation of the handle in the bearing 28 may take place freely in one direction. However, if the handle is acted upon by forces which result in relative rotative movement between the handle and its bearing 28 in an opposite direction, the roller bearings 42, 44, etc., are jammed against adjacent peripheral surfaces of the clutch sleeve 38 almost instantly, thus effectively checking any reverse motion. It will be apparent, therefore, that this overriding clutch insures a safety factor whereby the winding handle and shaft may be readily turned in one direction but in no circumstance can be whirled accidentally in an opposite direction to cause injury to an operator.

In combination with the overriding clutch assembly and winding shaft arrangement described, I further provide a winding drum 50 having a cross-sectional shape such as that illustrated most clearly in Fig. 3. This winding drum, it will be observed, is formed with a bore 50' slightly larger than the diameter of the clutch sleeve 38 so that these parts may be arranged in sliding relationship one over the other as further illustrated in Fig. 4. In addition, the winding drum is constructed with a shouldered inner peripheral section 52.

Supported between the shouldered section 52 and an adjacent annular section 53 formed on the clutch sleeve 38 is a sinuous spring member 56 which normally operates to maintain these surfaces in slightly spaced-apart relationship but permits the surfaces to move toward and away from one another in response to axially directed forces exerted on the winding drum.

Axially directed forces, in accordance with the invention, are developed by rotation of the handle 32 and the winding shaft 30 through the pin 40. As one convenient means of accomplishing this, I have devised a special drum formation in which the lower peripheral edge of the winding drum 50 is constructed with two diametrically opposed V-slots of which one, 58, is clearly shown in Fig. 3. One of the surfaces of the V-slot 58 is further indicated in elevation in Fig. 10 and is denoted by the numeral 58a.

The inclined surfaces comprised by these two V-slots in the winding drum operate to translate rotative movement of the pin 40 resulting from turning the shaft 30 into an axially directed force since the pin 40, as it turns, seeks to slide on the contacted surfaces of respective V-slots and thus axially displaces the drum against the resistance of the sinuous spring 56. The result thus obtained is a selective oscillation of the winding drum controlled by rotative movement of the winding shaft.

As axial displacement of the winding drum in one direction first takes place from rotation of the handle 30, there is simultaneously produced engagement of the winding drum with the spring held hook extremity 22 of the coiled spring 18. This is accomplished by means of elongated notched surfaces 51 formed at intervals around the periphery of the drum. These notched surfaces are designed to furnish locking edges into one of which the hooked extremity 22 may drop as the handle 30 starts to turn. It is pointed out that this engagement may be maintained during axial displacement of the drum by reason of the elongated surfaces 51.

Axial movement of the winding drum 50 produced in the manner described above is employed to selectively operate interlocking means for temporarily locking the spring rotor unit in fixed relation to the housing 12' and at the same time maintaining the sliding engagement of the drum with the spring rotor unit whereby the spring 18 may be wound upon itself with the spring rotor casing 14b. In this connection, I also provide special means for releasing and resetting the interlocking means. This interlocking and reset arrangement includes an actuating member 60, preferably consisting of a ring body of a shape such as is shown in Fig. 5. This ring body is formed with an extension 62 in which is cut a slot 64 defined by rounded outer edges.

The actuating ring 60 is adapted to be loosely supported around the clutch sleeve 38 and retained against a flange portion 38a of this sleeve which normally rests against the upper surface of the stationary casing 12' when the clutch sleeve is secured on the shaft by means of the pin 40. The winding drum 50 is formed with a corresponding flange portion 50a also adapted to bear against the opposite side of the actuating ring 60 in one position of oscillation of the winding drum, as has been suggested in Fig. 2.

Thus, the actuating ring 60 normally seeks to remain in a stationary position on the member 38. However, when the winding shaft 30 is rotated and the drum oscillates in a direction towards the flange 38a, it will be apparent that the flange 50a will force the actuating ring 60 lightly against the flange 38a of the clutch sleeve with sufficient frictional contact to cause the actuating ring to be turned through a short arc of rotation.

Rotative movement of the actuating ring 60 is made use of to engage the slot 64 of the extension 62 around a projecting pin 70 forming a part of the interlocking and reset means noted above, and as illustrated in Figs. 6, 7, 8 and 9. The reset means and interlocking mechanism is shown in detail in Fig. 6 and includes a pivoted member having an arm 72 which is adapted to swing about a pivot pin 74 in a boss 76 formed in the top of the stationary top cover 12' as best illustrated in Fig. 7. A spring 77 fixed to a post 78 engages the arm 72 and resiliently bears against it, as suggested in Fig. 4. The pin 70 is supported through an extension 79, as shown in Figs. 6 and 7. Cooperating with the pivoted arm 72 is a release element consisting of a trip lever 80 which is also pivoted in the cover 12' at 82. The trip lever 80 extends through a slot 83 in the member 12', as illustrated in Fig. 4 and Fig. 7 and is resiliently held by a spring 87 anchored to the top 12' at 89.

In Fig. 4, the trip lever 80 and the actuating pawl arm 72 are shown in a position of disengagement, as viewed from the upper side of the starting mechanism, with a portion of the stationary cover 12' broken away. These same parts are shown in Figs. 8 and 9 viewed from a point below the underside of the member 12' and indicating both a position of disengagement and a position of engagement of the arm 72 with the ratchet 16.

Considering the positions of the interlocking mechanism shown in Figs. 4 and 6, it will be observed that the arm 72 is lying out of contact with the ratchet 16. As rotation of the handle and winding shaft 30 starts, the extension 62 of the actuating ring 60, being frictionally engaged on the winding drum, seeks to turn through a short arc of travel until the slot 64 engages around a pin 70 as suggested in both Fig. 4 and Fig. 8. At this point the arm 72 is interlocked with the trip lever 80 in the uppermost notch 90 of this trip lever, being lightly held by the action of the spring 87.

On further rotative movement of the winding drum, counterclockwise as viewed in Figs. 8 and 9, the arm 72 is pivoted into the position shown in Fig. 9 and the arm 72 drops into the notch 92 of the trip lever 80 and simultaneously drops into the notch 94 of the ratchet 16. Immediately this engages the entire spring winding mechanism with the spring rotor unit and further rotation of the handle 30 causes the spring 18 to become wound upon itself within this casing.

As this rotation of the shaft and drum continues, and as the actuating ring 60 becomes interlocked with the pin 70, the ring 60 reaches a point at which it can turn no further. At this point, due to the light engagement of winding drum 50 against the ring 60, its flange 50 starts to slip on the actuating ring and thereafter turns on this member until the spring rotor unit again comes to rest and another winding operation starts.

Winding of the spring is continued until the capacity of the spring to become coiled is fully reached. It will be seen that at all points during this winding operation the trip lever 80 operates to maintain the arm 72 in its engaged position with the ratchet as long as it is in the position shown in Fig. 9. To release the engagement of the arm 72 with the ratchet 16, the trip lever is moved in a direction from right to left as viewed in Fig. 9 and the arm moves back into the position shown in Fig. 8 and simultaneously the spring rotor is free to spin in response to the energy of the coiled spring, thus starting the motor.

To facilitate the release movement of the trip lever 80 the ratchet teeth are made with sides which form obtuse angles and which therefore facilitate moving the trip lever into the position shown in Fig. 8 as well as enabling the cornered extremity of arm 72 to slide upwardly on its engaged tooth surfaces in response to the force of the coiled spring. The tendency for the arm 72 to slip out of engagement with the ratchet teeth is further augmented by the flat spring 77 which normally seeks to hold the arm in the position shown in Fig. 8. Therefore, the arm 72 and its extension 79 are caused to swing into a position into which the pin 70 becomes disengaged from the actuating ring and in this disengaged position is ready to cooperate with the actuating ring when the next winding operation is started. Thus the interlocking mechanism is automatically reset in a position such that it becomes impossible for anyone to start winding the spring mechanism without the trip lever being set in a holding position.

From the foregoing description it will be apparent that I have disclosed a safe, efficient and effective starter winding mechanism which can be conveniently attached to many forms of motors as well as other forms of rotatable bodies and it is intended that various changes and modifications may be made in the several component parts of my device within the scope of the appended claims.

This application is a continuation-in-part of my copending application Serial No. 523,209 filed July 20, 1955.

Having thus described my invention, what I now claim is:

1. A starting device for a motor having a rotatable shaft portion, said device comprising a spring rotor unit, a stationary housing overlying the spring rotor unit, a spring winding mechanism operatively connected to the rotor unit, said rotor unit including a cylindrical spring casing solidly secured to said rotatable shaft portion, a spring member having one end anchored to the peripheral surface of the spring casing and coiled upon itself around the spring casing and defining a central opening within said spring casing, said spring winding mechanism including a winding drum located within said central opening, an operating handle connected to the winding drum and extending externally to the stationery housing, means for producing an axial displacement of the winding drum when the operating handle is turned, means for releasably attaching a free end of the spring with said winding drum, and mechanism responsive to axial movement of the winding drum for holding the casing in engagement with the stationary housing for a limited period while the spring is mounted around the drum.

2. A structure according to claim 1 in which the mechanism for holding the spring casing in engagement with the stationary housing includes a ratchet member fixed to said spring rotor casing, a pawl member pivotally supported in the stationary housing, and a second releasable pawl member cooperating with the said first pawl to hold the ratchet member in a fixed position.

3. A structure according to claim 2 in which the spring winding mechanism includes an actuating ring member for moving the said second pawl member into a holding position on the ratchet when the spring winding mechanism is rotated by said operating handle.

4. A structure in accordance with claim 3 including an externally disposed trip lever for disengaging the said second pawl member from the spring rotor ratchet after the spring mechanism is fully wound.

5. A structure in accordance with claim 4 in which the trip lever is formed with a notched extremity and the said second pawl member includes a spring for rotating the pawl against the notched extremity to automatically reset the trip lever in a holding position when the pawl becomes disengaged from the ratchet.

6. A turning device for a rotatable body comprising a spring rotor unit adapted to be solidly secured to the rotatable body, a stationary housing overlying the rotor unit, spring winding mechanism including a winding drum supported for rotative movement in the stationary housing and including means for engagement with the rotor unit in order to impart winding movement thereto, means for moving the winding drum axially as it is rotated, an interlocking device responsive to axial movement of the winding drum for securing the rotor unit in fixed relation to the stationary housing when the winding mechanism is being turned in one direction, a release lever for releasing the interlocking means, and a reset apparatus for resetting the interlocking means and release lever.

7. In combination with a rotatable body a turning device for imparting rapidly accelerating rotative movement to the rotatable body, said turning device comprising a spring rotor unit for fixed engagement with the rotatable body, an outer housing adapted to be mounted in a stationary position about the spring rotor unit, a spring winding mechanism including an axially shiftable winding drum supported for rotative movement in the outer housing and including means for releasably engaging with the spring rotor unit, interlocking means responsive to axial movement of the winding drum for temporarily securing the spring rotor unit in fixed relation to the stationary outer housing, and manually operated trip lever means for disengaging the interlocking means when the spring winding mechanism is in a fully wound state.

8. A structure according to claim 7 including reset means for automatically resetting the interlocking means and trip lever in a holding position when rotative movement of the spring winding mechanism is again started.

9. In combination with a rotatable body a turning apparatus for imparting rapidly accelerating rotative movement to the rotatable body, said turning apparatus comprising a spring rotor unit fixed on the rotatable body, a casing adapted to be secured in a stationary position overlying the spring rotor unit, a spring winding mechanism including an axially displaceable winding drum supported for rotative movement in the casing and presenting a handle element extending outside of the casing, means included in the spring winding mechanism for releasably engaging the spring rotor unit, interlocking means responsive to axial movement of the winding drum for temporarily securing together the stationary casing and the spring rotor unit, trip lever means located through said stationary casing for disengaging the interlocking means when the spring winding mechanism is in a fully wound state.

10. A structure according to claim 9 in which the spring winding mechanism includes a pair of cooperating clutch elements for limiting movement of the spring winding mechanism to rotation in that direction only in which the spring mechanism is wound.

11. In combination, a motor having a rotatable part, a starting device for imparting rapidly accelerating rotative movement to the rotatable part, said starting device comprising a spring rotor unit fixed to the rotatable part and including a spring casing, a ratchet element fixed to the casing, and a spring member, one end of said spring being anchored to the inner peripheral surface of the spring casing and coiled upon itself around the spring casing to define a central opening, the opposite end of said spring including a pivoted hook portion, a stationary housing overlying said spring casing and having a winding shaft mounted for rotative movement therein, a handle fixed to the shaft at a point outside of the housing, clutch means located around the shaft for limiting movement of the shaft in one direction only, an oscillatable winding drum slidably disposed over said clutch means and extending through the central opening in the coiled spring, said drum being formed with notches for receiving the pivoted hook portion, an interlocking mechanism for detachably securing the spring rotor unit and its ratchet element in fixed relation to the housing, a release lever projecting through the stationary housing for manually disengaging said interlocking mechanism, an activating ring mounted around the clutch means and engageable by the oscillator drum, said activating means adapted to rotate in response to movement of the drum and to move the interlocking mechanism into a holding position and means forming a part of the interlocking mechanism for automatically resetting the release lever when the spring is wound.

12. A structure as defined in claim 11 in which the interlocking mechanism includes a panel member pivotally supported in the housing in a position to move into and out of engagement with the ratchet element, spring means for holding the panel member in one position, a notched locking extremity forming a part of the release lever, said notched locking extremity cooperating with the ratchet element to releasably secure the panel member in engagement with the ratchet.

References Cited in the file of this patent

UNITED STATES PATENTS

| | | |
|---|---|---|
| 950,848 | Gardner | Mar. 1, 1910 |
| 2,568,136 | Weimer | Sept. 18, 1951 |